(12) United States Patent
Grasso, Jr.

(10) Patent No.: US 10,858,284 B2
(45) Date of Patent: Dec. 8, 2020

(54) PROCESSING WASTE CATHODE RAY TUBE GLASS WITH OTHER WASTE GLASS INTO A POWDER

(71) Applicant: Urban Mining Northeast, LLC, New Rochelle, NY (US)

(72) Inventor: Louis P. Grasso, Jr., New Rochelle, NY (US)

(73) Assignee: Urban Mining Northeast, LLC, New Rochelle, NY (US)

( * ) Notice: Subject to any disclaimer, the term of this patent is extended or adjusted under 35 U.S.C. 154(b) by 116 days.

(21) Appl. No.: 15/806,689

(22) Filed: Nov. 8, 2017

(65) Prior Publication Data

US 2018/0127313 A1 May 10, 2018

Related U.S. Application Data

(60) Provisional application No. 62/420,208, filed on Nov. 10, 2016.

(51) Int. Cl.
  *C09C 1/14* (2006.01)
  *C04B 14/22* (2006.01)
  (Continued)

(52) U.S. Cl.
  CPC ............... *C04B 14/22* (2013.01); *B09B 3/00* (2013.01); *B09B 3/0041* (2013.01); *B09B 5/00* (2013.01);
  (Continued)

(58) Field of Classification Search
  USPC .................................. 106/400, 401, 432, 435
  See application file for complete search history.

(56) References Cited

U.S. PATENT DOCUMENTS

| 5,246,174 A | 9/1993 | Vitunac et al. |
| 5,350,121 A | 9/1994 | Vitunac et al. |

(Continued)

FOREIGN PATENT DOCUMENTS

| AU | 2013219194 A1 | 3/2014 |
| CA | 2869431 A1 | 10/2013 |

(Continued)

OTHER PUBLICATIONS

A comparative study on the feasible use of recycled beverage and CRT funnel glass as fine aggregate in cement mortar, Ling et al., retrieved from http://www.sciencedirect.com/science/article/pii/S0959652612000935?v=s5.

*Primary Examiner* — James E McDonough
(74) *Attorney, Agent, or Firm* — Gordon & Jacobson, P.C.

(57) ABSTRACT

A method of processing cathode ray tube (CRT) glass with waste glass into a pozzolanic mixture includes, receiving CRT glass aggregate, pulverizing the CRT glass aggregate forming an intermediate CRT glass product, fine grinding the intermediate CRT glass product into a powder, receiving waste glass, pulverizing the waste glass forming an intermediate waste glass product, fine grinding the intermediate waste glass product into a waste glass powder, and combining the waste glass powder with the CRT glass powder by weight or volume to form the pozzolanic mixture. The pozzolanic mixture may be used in place of Portland cement in a cementitious mixture. Also, a leaded portion of the CRT glass may be used in the cementitious mixture to act as a radiation barrier.

3 Claims, 4 Drawing Sheets

(51) Int. Cl.
    *B09B 5/00*     (2006.01)
    *B09B 3/00*     (2006.01)
    *C03C 3/097*     (2006.01)
    *C03C 1/00*     (2006.01)
    *C03C 12/00*     (2006.01)
    *C04B 14/00*     (2006.01)

(52) U.S. Cl.
    CPC .............. *C03C 1/002* (2013.01); *C03C 3/097* (2013.01); *C03C 12/00* (2013.01)

(56) References Cited

U.S. PATENT DOCUMENTS

| | | |
|---|---|---|
| 6,296,699 B1 | 10/2001 | Jin |
| 2003/0041783 A1 | 3/2003 | Monawar |
| 2005/0257719 A1 | 11/2005 | Kim et al. |
| 2006/0130707 A1 | 6/2006 | Grasso, Jr. et al. |
| 2011/0172075 A1* | 7/2011 | Grasso, Jr. .............. B02C 23/08 501/11 |
| 2013/0112696 A1 | 5/2013 | Fenelon |
| 2014/0021419 A1 | 1/2014 | Baier et al. |
| 2014/0345326 A9* | 11/2014 | Grigorenko ........... C22B 13/045 65/31 |
| 2015/0007748 A1 | 1/2015 | Welk |
| 2016/0264468 A1* | 9/2016 | Burgos Enriquez .... C04B 28/04 |

FOREIGN PATENT DOCUMENTS

| | | |
|---|---|---|
| CA | 2826586 A1 | 3/2014 |
| EP | 2103579 A1 | 9/2009 |
| GB | 2480686 A | 11/2011 |
| KR | 10-1270115 | 5/2013 |

* cited by examiner

PROCESSING WASTE CATHODE RAY TUBE GLASS WITH OTHER WASTE GLASS INTO A POWDER

CROSS-REFERENCE TO RELATED APPLICATION

This application claims benefit to U.S. Provisional Ser. No. 62/420,208, filed Nov. 10, 2016, which is hereby incorporated by reference herein in its entirety.

BACKGROUND

1. Field

This description relates to the processing of waste glass into a pozzolan and industrial fillers.

2. State of the Art

Certain post-consumer recycled glass has been shown capable of being processed into a finely powdered glass pozzolan and industrial filler. ASTM C-618 is the standard that fly ash and natural pozzolans must meet in order to be suitable as supplementary cementitious materials in concrete. The standard requires that the pozzolan have a minimum of 70%, by total weight, of silica ($SiO_2$), alumina ($Al_2O_3$) and iron ($Fe_2O_3$). Soda lime glass, or bottle glass, has a generally consistent silica content in excess of 70% and thus when properly processed has the chemical constituents required to meet the standard.

Material recovery facilities (MRFs) receive recyclable materials. In a relatively automated process, a MRF separates recyclables collected primarily from residential curbsides into homogeneous product streams (e.g., cardboard, mixed paper, aluminum cans, glass bottles, etc.). In addition, such recyclable glass-containing materials can be received from other sources. Other sources include, but are not limited to, restaurant and bar bottle collection companies, and construction and demolition MRFs. For purposes herein, MRF shall be used to inclusively represent all of these sources of post-consumer waste glass (PCWG).

There are two types of MRFs: single stream and dual stream. Initially, all residential MRFs were dual stream. In a dual stream MRF, paper products are collected separately from cans, bottles and plastics. A dual stream MRF has picking lines where unbroken clear and amber bottles are hand-picked and color separated, with the broken and green glass disposed. With the advancement of MRF processing technology allowing for more capital intensive automation that is cost justified by the reduction in labor effort, most dual stream MRFs converted to single stream.

For single stream MRF processing, all recyclables are comingled at the curbside. Glass is a problem in a single stream MRF because of the damage glass can cause to the processing equipment. Therefore, most single stream MRFs crush the comingled materials and screen the glass out early in the sorting and separation process, often after cardboard removal. Along with the glass comes bits and pieces of plastic, paper, ferrous and non-ferrous metals, ceramics, stones, dirt and organics such as pizza crust, etc.

Typical single stream MRF residue is 70%-85% glass, 1%-10% moisture and the remaining being undifferentiated trash. The broken glass size is typically 2 to 3 inches and smaller (2 or 3 inch minus). The plastic fraction may contain large pieces (e.g., whole plastic bottles, plastic bags) down to bottle cap size pieces and smaller. The non-ferrous material is mostly aluminum with small quantities of solid non-ferrous objects such as brass fittings. Although the moisture content is relatively low, the material appears wet because most of the moisture is contained in the paper component. Due to the paper wetness, the paper adheres to the glass and other solid components.

The current basic method for separating the glass from the non-glass components includes pulverizing the material as it is received from the MRF. This reduces the glass size from two inch minus to ⅜ inch minus without reducing the size of most of the non-glass components. A simple screen then achieves a reasonably good separation. There are, however, small bits and pieces of foreign materials as well as the liquid organic component from the glass bottle contents left behind with the glass. The fundamental problem with this method results from the size reduction. Not only does it generate a significant amount of fines (e.g., glass powder less than 40 mesh), it spreads the liquid organic fraction over a significantly larger surface area. Both of these issues cause subsequent cleaning challenges.

The cleaning has been accomplished by one of two methods: washing and baking. Washing the glass is a proven effective method, but all of the fines end up in the waste water sludge which not only loses potential glass product, the sludge is difficult to dewater and handle. The other method is baking the contaminants off in a fluidized bed dryer at 400° F. The action of fluidization causes particle-on-particle collisions, which knocks most of the baked organic material off of the glass. There must be sufficient residence time and air flow to achieve sufficient cleanliness. The problem is that the airflow required to remove the contaminants to a dust collector from the fluidized glass also removes the glass fines.

The only known installation using fluidized heat to clean dirty MRF glass so far has been unable to produce sufficiently clean glass on a consistent basis. A sample of purportedly clean residue was obtained from the installation and subjected to testing under a loss on ignition (LOI) test. Such a test measures how much of a product is lost, by weight, upon burning. Where there is a high organic component, the loss will be relatively high. When several samples were tested, the overall loss was measured at 1.44%. While this may not seem high, such a result indicates that the purportedly clean glass still contained unsuitably high organics for various end-uses, including use as a pozzolan.

Cathode ray tubes (CRT's) are considered a hazardous waste by the U.S. Environmental Protection Agency. The CRT is made of glass. The whole CRT glass is made up of two components, the ray tube glass (TG) and the panel glass (PG). The ray tube glass and panel glass, though joined together in the waste stream, can be separated by laser cutting the panel glass from the ray tube. The panel glass does not contain lead, but the ray tube glass does contain lead. However, because the panel glass was manufactured connected to the lead-containing ray tube, the entire CRT glass is considered hazardous waste. CRT disposal is very costly. CRT glass is the most problematic material found in municipal solid waste and private waste stream.

The State of California has recently passed legislation (Assembly Bill 1419), which if enacted, would give an opportunity for any CRT glass that's free of lead to be used for specific beneficial end uses. However, owing to the many CRT's produced over the years, and the many different manufacturing locations of the CRT's, is the potential for a lot of variability in the composition of the glass used in the CRT's. Moreover, literature on CRT panel glass identifies the CRT panel glass as having silica, alumina, and iron concentrations as low as 60%. Thus, for several reasons its direct use as a post-consumer recyclable has been limited.

SUMMARY

As used herein "waste glass" will be used to refer to all types of glass in waste streams, including post-consumer waste glass as well as post-industrial waste glass, whether or not processed at a MRF. While CRT glass is broadly included in "waste glass", for purposes of this description, CRT glass will be discussed as a separate type of glass from other waste glass, as will become apparent from the following discussion. Thus, any further reference to waste glass herein will refer to all waste glass other than CRT glass.

According to one aspect of the disclosure, further details of which are described below, a processing method includes processing CRT glass (panel glass and tube glass) with other waste glass (e.g., MRF glass) into a pozzolanic mixture for use as a substitute for Portland cement in a cementitious mixture, as well as in industrial fillers.

CRT panel glass has substantially no detectable amount of lead. As noted above, in view of proposed legislative changes, beneficial uses of lead-free CRT panel glass is likely to be permitted. There is a lot of variability in the chemical composition of the full spectrum of CRT panel glass and tube glass in the waste stream. For example, the silicon dioxide concentration of CRT panel glass can be as low as 60%, which, by itself, is not suitable as a pozzolan.

However, even with such low silicon dioxide concentrations, the CRT glass can be blended or co-milled with waste glass (e.g., soda lime glass) feedstock to form a blended pozzolan for use in concrete. Blending or co-milling the CRT panel glass and the waste glass can create a more consistent material that meets or exceeds the ASTM C-618 standards for chemical content, which require that the sum of the oxides of silica, alumina, and iron be at least 70% of the total weight of the concrete mixture.

CRT tube glass has a lead content in excess of 20%, generally at about 23% to 25%. Extracting the lead from the tube glass is very expensive. However, as will be described herein, a new use of the CRT glass includes processing the leaded tube glass as both a pozzolan and a radiation barrier in radiation barrier concrete, such as may be used for building walls of hospital X-ray diagnostic rooms or walls in nuclear power plants. Specifically, incorporating CRT tube glass into concrete can provide a benefit to the concrete's ability to create a barrier to radiation. With regard to a lifecycle assessment of concrete incorporating the CRT tube glass, all concrete used for radiation barrier would be considered hazardous waste. However, the CRT tube glass in the radiation barrier concrete would not add to the volume of hazardous waste because its use in the concrete initially replaces a percentage of Portland cement that would have been needed to create the radiation barrier concrete had the CRT tube glass not been used. Thus, the radiation barrier concrete yields no added volume of hazardous waste needing to be properly disposed of.

As will be described below, the glass used in the mixture is cleaned and dried in accordance with another aspect of the disclosure. For example, a method is provided to clean waste glass that may be mixed with non-glass undifferentiated trash (e.g., MRF glass). In accord with one aspect of the method, the glass pieces are kept as large as possible to thereby minimize the amount of surface area that needs to be cleaned. In accord with another aspect of the method, the glass pieces are cleaned without washing the glass pieces with water or a surfactant during the cleaning process. The method requires liberating the non-glass contaminants from the glass by drying and abrasion, and then removing the liberated contaminants by screening and density separation.

In accord with one method, the following steps to clean waste glass are performed, which may be altered depending on various optional aspects of the method. The steps include:
1. Screen out large foreign materials
2. Dry and disassociate components.

Then, preferably, in order:
3. Remove ferrous metals.
4. Screen the glass pieces into particle size categories.
5. Separate light materials from heavy materials in the size-categorized glass.
6. Optionally, isolate colored glass.
7. Remove non-ferrous metals from the glass pieces.
8. Comminution of the cleaned glass to appropriate size.

The resulting clean glass can be further processed into a number of products that range in size from sub-micron to 1½ inch glass aggregate. These products include, but are not limited to, fine grind products such as pozzolans for use as a cement replacement in concrete and industrial fillers for use in coatings and resins, sand-sized products such as abrasive blasting media, water filtration media, specialty sands paver joint sand, sealcoating sand and non-crystalline silica play sand, and finally aggregate sized products for use in landscaping, decorative concrete, fire pits, etc.

Furthermore, the product may be sanitized to remove active biologics so that the products can be used in medical applications, clean-room applications, or other applications requiring a sanitized product. Such sanitization can occur during the initial drying step, or during or after another disclosed step.

Additional aspects of the methods discussed above will become apparent with reference to the detailed description below.

DETAILED DESCRIPTION

In accord with the method herein, the following preferred steps are provided to process waste CRT glass (tube and panel glass) and waste glass into a finely ground powder suitable for use as a pozzolan or industrial filler. Specifically, the finely ground powder of waste glass and CRT glass is used to replace Portland cement in a cementitious mixture. Examples of cementitious mixtures using such finely ground powder will be described with regard to ASTM test results.

Two exemplar methods of producing a pozzolanic mixture of CRT glass and waste glass will be described below. A first method includes: 1) milling CRT glass and waste glass separately into respective powders and blending the milled glass powders proportionally into a mixed pozzolanic powder; and 2) mixing unmilled or non-finely ground CRT and waste glass by weight and co-milling the mixed CRT glass and waste glass. In either example method, clean waste glass and CRT glass is preferred.

Thus, a method is provided to clean glass, such as glass mixed with non-glass undifferentiated trash. The cleaning method is optionally performed only on the waste glass, and not the CRT glass, as the CRT glass may be received in a suitably clean state for subsequent processing. In accord with one preferred aspect of the method, the glass pieces are as kept as large as possible to thereby minimize the amount of surface area that needs to be cleaned. In accord with another preferred aspect of the method, the glass pieces are cleaned without washing the glass pieces with water or a surfactant during the cleaning process.

Figure 1:
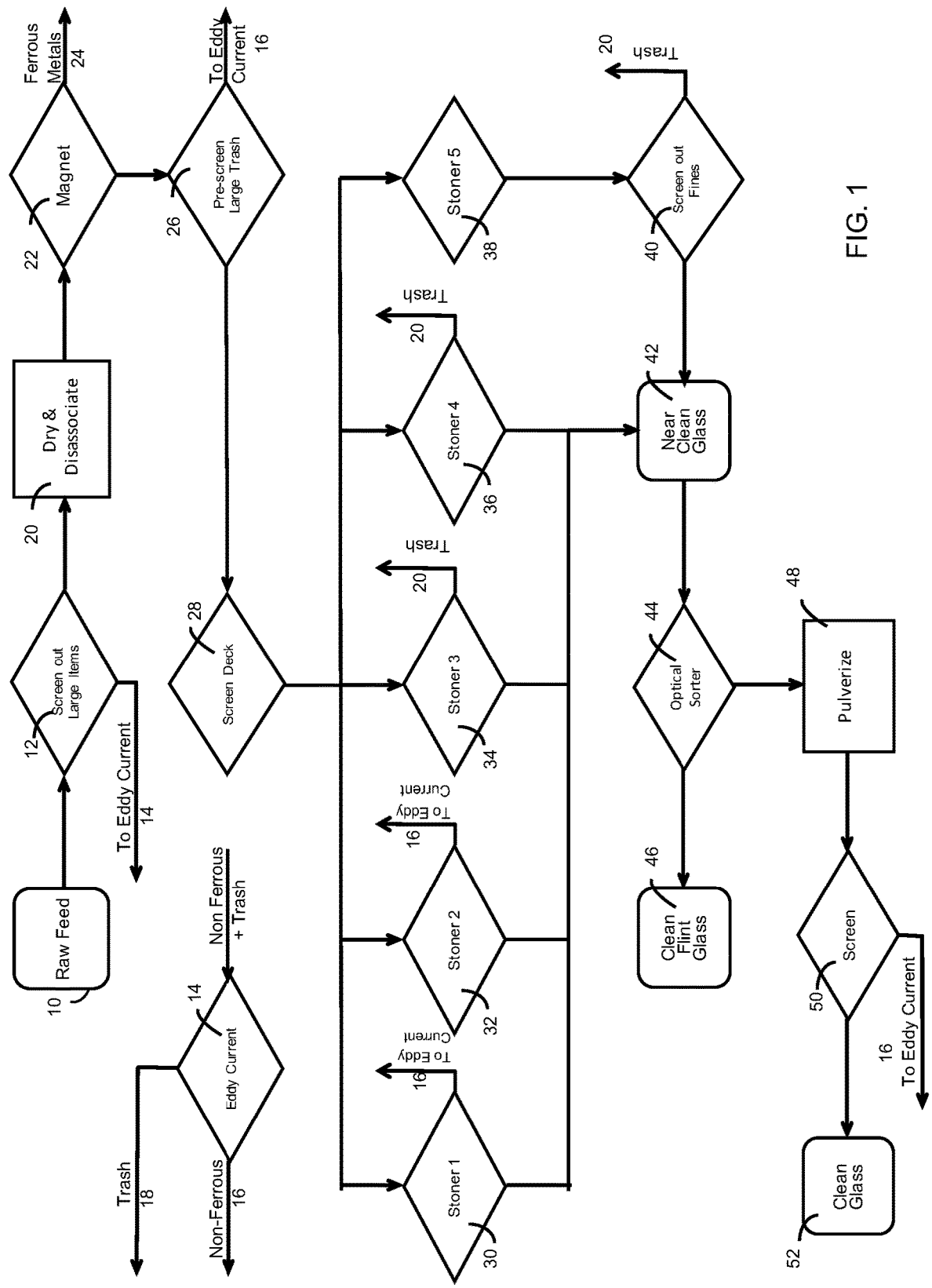
FIG. 1 is a process flow diagram for a glass cleaning portion of the process.

Turning now to FIG. 1, the method to clean the glass mixed with non-glass undifferentiated trash (residue) includes the following steps. The residue is received at 10 from storage, shipment, or conveyance. As indicated above, the residue contains moisture content, generally of 1% to 10%, mostly held in a wet paper constituent of the residue.

A first step may include screening out larger foreign materials from the glass constituent. The raw material contains larger plastic pieces (e.g., 4 inch diameter plastic lids, plastic bags, etc.) that must be removed prior to a subsequent glass separation processes, discussed below. Testing has revealed that failing to do this step significantly reduces separation efficacy. This can be achieved by a stationary grizzly, vibratory screen, or a cylindrical trommel type screen. The most problematic materials are plastic bags which can trap a significant amount of glass which gets lost when the bags are removed. The preferred method is a rotary screen or trommel screen 12 because the tumbling action of the screen empties the plastic bags. The size of screen aperture will depend on raw material glass size, but typically is between 2 to 3 inches. The larger trash from the screen 12 is sent to an eddy current system 14 that further separates non-ferrous metal from trash, for respective storage of each: non-ferrous metal storage at 18 and trash storage at 20.

Next, the screened glass is dried, polished and disassociated at 20. The drying reduces moisture content to an acceptable level. The disassociation of components liberates the glass. The polishing removes dried organic liquids and semi-liquids and labels off of the glass. Alternatively, due to the stickiness of the wet paper, a first stage of the process can include sufficiently drying, polishing, and agitating the raw residue to disassociate all of the disparate materials and liberate the glass, prior to the screening. However, the method, for purposes of the description herein, will assume screening prior to this drying step.

While several different drying technologies can be used, preferred drying uses a rotary dryer. A rotary dryer is made up of a large, rotating cylindrical tube, usually supported by concrete columns or steel beams. The dryer is configured to slope slightly so that the discharge end is lower than the material feed end in order to convey the material through the dryer under gravity. The residue material to be dried enters the dryer, and as the dryer rotates, the material is lifted up by a series of internal fins ("lifters") lining the inner wall of the dryer. When the material gets high enough to roll back off the fins, it falls back down to the bottom of the dryer, passing through the hot gas stream as it falls. This gas stream can either be moving toward the discharge end from the feed end (known as co-current flow), or toward the feed end from the discharge end (known as counter-current flow). The gas stream can comprise a mixture of air and combustion gases from a burner, in which case the dryer is called a direct heated dryer. Alternatively, the gas stream may comprise air or another (sometimes inert) gas that is preheated. When the gas stream is preheated by some means where burner combustion gases do not enter the dryer, the dryer known as an indirect-heated type. Often, indirect heated dryers are used when product contamination is a concern. It is also possible to use a combination of direct-indirect heated rotary dryers to improve the overall efficiency.

The action of lifting and dropping the material in the drum thoroughly disassociates the components and liberates the glass. This action also reduces the size of the glass to which extent depends on the residence time. For example, a test in a rotary dryer with a residence time of 30 minutes reduced the glass size from 2 inch minus to less than 1¼ inch. Shorter residence time will result in less size reduction. The lifting and dropping action also eliminates all (or substantially all) of the sharp edges and polishes most of the organic material off of the glass. The only remaining organic material on the glass are residual labels on approximately 1% to 10% of the larger glass pieces. Shorter residence times will result in more residual labels on the glass. Longer residence times will result in further reduction of moisture content, enhanced liberation and disassociation of the glass from bottle labels, enhanced removal of organic contaminants, and additional polishing of the edges of the glass.

Any type of rotary dryer can be used including but not limited to direct fired, indirect fired, combined direct and indirect, co-current flow, counter-current flow, natural gas or electric.

Further, as one alternative to a rotary dryer, a heated fluidized bed dryer may be used. A fluidized bed is formed when a quantity of a solid particulate substance (usually present in a holding vessel) is placed under appropriate conditions to cause a solid/fluid mixture to behave as a fluid. This is usually achieved by the introduction of pressurized fluid (normally air) through the particulate medium. This results in the medium then having many properties and characteristics of normal fluids, such as the ability to free-flow under gravity, or to be pumped using fluid type technologies. When heated air is used to fluidize the material bed, it imparts a drying effect to remove moisture from the residue. Since there are particle-on-particle collisions in the fluidization process, the disparate materials are dissociated, hence liberating the glass. However, using this method to dry and liberate the glass will result in very little size reduction of the glass and is less efficient in polishing labels and other organics off of the glass than a rotary dryer.

The application of either rotary dryer or fluidized bed technologies can sanitize the material. Sanitization means killing all of the bacteria. Since the residence time in the fluidized bed dryer is relatively short, it must be operated at a temperature around 400° F. for sanitization. Sanitization in a rotary dryer would require the glass to be heated to 250° to 300° F. The flame temperature required to heat glass to these temperatures will depend on residence time; i.e., shorter residence times require higher temperatures. Another option for sanitization is to operate the rotary dryer at the minimum temperature to achieve separation and glass liberation and employ a fluidized bed dryer at the end of the process at the appropriate temperature.

A currently preferred method of drying, sanitizing and disassociation is with a natural gas direct-fired co-current flow rotary dryer with lifters.

The order of the screen (and screening) 12 and the dryer (and drying) 20 may be optionally interchanged, such that the dirty waste glass is sent through the screen 12 after being dried in the dryer 20, as shown at 26.

Ferrous metals are removed at 24. An inline or rotating belt magnet 22 is used to remove the ferrous metals and send such ferrous metal material to a ferrous metal storage 24.

In a first stage of screening at 26 (if not carried out previously at 12), foreign materials larger than the largest piece of glass are removed as the glass is received from the dryer and ferrous metal removal steps. Non-ferrous foreign material is removed from the other foreign material via eddy current 16. The screen size is set depending on the size of the glass raw feed and residence time in the dryer. In one system, the screen size is between 1¼ and 1½ inches. A horizontal vibrating table screen may be used to screen the foreign materials of such size.

Then, in a second stage of screening, a screen deck 28 is used to separate the glass pieces into multiple size categories for respective density separation 30, 32, 34, 36, 38 within each size category, as described in detail below. Preferably a deck of five size categories is used, which has been shown to work particularly well. Density separation separates lighter density materials from heavier density materials. This technology has been found to be most effective when the particles are of relatively similar size. Therefore, the more size classes created for separation of the particles, the more effective the separation has been found to be. A field test with two size categories did not result in particularly satisfactory separation and both size fractions required further processing. A test with four particle size categories was shown to effectively separate glass from the lighter density foreign materials but in the smallest size, the smaller glass particles fluidized and went with the lighter fraction. This was solved by adding an optional fifth particle size category by splitting the smallest size into two categories. In a preferred embodiment, a single four-deck screen 28 is used to create all five size categories simultaneously. However, fewer or more screens can be used to create fewer or more size categories as dictated by the range in glass particle sizes.

The selection of the upper and lower size of each particle size category has a significant effect on separation efficacy. A significant variable is the percentage size difference between the largest and smallest particle. Referring to Table 1, below, a preferred size range in each of five particle size categories of the screens is provided, along with the percent difference in size between the largest and smallest particle in each screen size category. During a test that resulted in excellent separation for the 1¼ inch to ¾ inch size category, the particles had a potential range of ½ inch; i.e., no more than 40 percent difference between the largest and smallest particle. In another test, a size category was set up for particles between ⅜ inch to 12 mesh. Even though this size differential was less than ⅓ of an inch, the separation was unacceptable; it was noted that the potential size different between the largest and smallest particle in the size category was an 82% size difference. Based on this knowledge, the optimal size categories are shown in Table 1, with the percent difference between the largest and smallest particle.

TABLE 1

Particle Size Ranges for Screen Deck
Five Size Categories

| Size range | % Difference in Size |
|---|---|
| 1¼−, ¾+ | 40% |
| ¾−, ⁷⁄₁₆+ | 42% |
| ⁷⁄₁₆−, ¼+ | 43% |
| ¼−, ⅛+ | 50% |
| ⅛−, 14 mesh− | 56% |

In a preferred embodiment, the four deck screener 28 is preferably configured to separate glass into the five particle size categories shown in Table 1. Dirty waste glass can come from many different sources and each source produces a glass residue unique to each waste process and habits of the human population that the waste glass serves. Therefore, variability in glass size and non-glass composition is expected and must be dealt with effectively. By sorting the material stream into five size categories, this variability becomes a non-factor.

After the material is sorted by size, the trash is separated from the glass using density separation, as the glass and most of the trash have different densities. (Non-ferrous trash of similar densities is dealt with later in the process.) Each size fraction is processed in a separation technology that employs vibration and air to separate materials by density. This technology is commonly known as a "Stoner" or "DeStoner".

Standard Stoner technologies can each be used in the method. The density separation technology manufactured by General Kinematics (GK), called a DeStoner by GK, employs a vibrating trough that uses air to fluidize the bed material causing light material to rise above the heavier material. A jet of air (or "air knife") at the right velocity and elevation blows the light material over a dividing plate and the heavy fraction drops to a conveyor below. This technology comes in "single knife" and "dual knife" versions. Dual knife Stoners have a built in screen to divide the material into two size fractions and separation is accomplished with two air knives on separate troughs with separate blowers.

Density separation can be described using an exemplar ideal situation in which two different materials have the exact same size and shape. If these materials have a density different greater than 20%, the technology will yield perfect separation. In the real world, particles do not have the exact same size and shape. However, sorting the material into the five (or so) size categories comes as close as practical to mimicking the ideal situation. The Stoner separation of the trash for the ⅛ minus size category is effective down to approximately 10 to 12 mesh; i.e., only particles greater in size than 10 to 12 mesh are recovered and smaller glass particles are fluidized and slide downhill with contaminants. It has been found that the contaminants in 12 mesh minus material are the fine dust polished off the glass and other solid foreign objects and the fine dust from soil that is reduced to a very small size in the rotary dryer. A 40 mesh vibratory screen can be used at 37 to effectively separately these contaminants from the 12 to 40 mesh glass.

In a test, material that was dried in the rotary dryer was screened into two sizes of approximately equal weight: (1) 1¼ inch minus to ⅜ inch plus, and (2) ⅜ inch minus. A test run of the ⅜ inch plus size fraction on a single knife Stoner removed the vast majority of non-glass material; however, heavy plastic pieces, stones, ceramics, and plastic bottle caps were easily visible in the glass. For example, if a plastic screw-on bottle cap becomes filled with smaller glass particles it will act like a heavy particle instead of a light particle. These foreign materials will need to be removed in a subsequent step. A test run on the ⅜ inch minus fraction used different air pressure settings for the fluidization and air knife and resulted better separation, but the glass is still not clean enough.

The other "Stoner" technology employs a fluidized horizontally vibrating bed that is set on a slight angle. Given the correct vibration intensity, bed angle and air flow, heavier material is not fluidized and travels uphill and off the bed. The light material is fluidized and slides downhill and off the bed due to gravity. The reason the heavy particles flow uphill is due to horizontal vibration and lack of fluidization; i.e., the heavy particles are in constant contact with the bed and are pushed upward by the horizontal vibration. There are several manufacturers of these types of Stoners offering variations on the same principal and including, but are not limited to, Triple S Dynamics (SSS), Oliver and Carrier.

A test was run by screening the material into four different size categories: 1¼ inch-¾ inch; ¾ inch-½ inch; ½ inch-⅜ inch; and ⅜ inch-14 mesh. As previously discussed, the three largest categories produced outstanding separation but the ⅜ inch-14 mesh could not get the smaller glass particles to move uphill (or upgrade) with the larger glass particles. This is determined to be because the percent difference between the smallest and largest particles is too large. Splitting this size category into two sizes produced excellent results. The conclusion from these tests is that separating the glass into five size categories, using five Stoners 30, 32, 34, 36, 38, each for a separate particle size range category, is particularly advantageous for the efficient separation of glass from foreign particles.

A test run of the 1¼ inch to ⅜ inch particle size material containing foreign particles that was produced by the GK DeStoner on the SSS Stoner resulted in excellent separation. Both technology types will work, but the preferred technology is the SSS for several reasons. First the technology is simple and easy to master because the separation can be visualized as it occurs. Once the air speed, bed angle and vibration frequency are set, it requires very little attention because the variation in the feedstock size is removed by screening it into five size categories. Also, a single person can operate all five Stoners. Second, having five Stoner units provides flexibility to handle different glass feedstocks. Viewing the separation real time in the GK technology is not as easy and since only two size categories are processed, it will require constant attention to adjust air flows as feedstock size and composition varies.

Stoner manufacturers have previously tried to separate dirty waste glass. However, in such prior instances, the Stoner (or DeStoner) did not adequately separate the materials and was rejected as a suitable technology for glass recovery. The reason those tests failed is that the glass was not previously dried to liberate the glass in accord with the method taught herein.

After density separation at 38, the smallest range of particles is further screened at 40 to remove fines, which are sent to trash 20. The resulting glass from stoners 30, 32, 34, 36, 38 and fine screen 40 is provided at a near clean state 42.

Then, the glass is optionally optically sorted at 44 to segregate the clean flint cullet 46 from the colored recycled glass. Flint cullet is optical glass that has a relatively high index and low Abbe number (high dispersion). Flint glasses are arbitrarily defined having an Abbe number of 50 to 55 or less, and refractive indices ranging between 1.45 and 2.00. Potential end-use products for the cleaned flint cullet include an extremely bright and white glass powder that can be used as a pozzolan in architectural concrete products or as industrial filler. If a significant percentage of the clean glass is colored glass, the glass cannot be used for such end-use products. Since the raw feedstock is mixed color, optical sorting technology is employed to isolate the flint cullet from the colored glass, so that the flint cullet can be used as a feedstock for the white pozzolan and industrial filler. The two largest size categories of glass from the Stoner, ⁷⁄₁₆ inch to 1¾ inch, are processed by the optical sorter, and separated into a clean flint glass storage bin 46.

The objective of the optical sorting is to minimize the percentage of non-flint glass within the clean flint glass storage 46 to less than 2 percent. This can be accomplished with one optical sorter that is calibrated to minimize non-flint colors, but allows some minimal degree of flint glass to pass with the non-flint fraction. Although this does not maximize the capture of flint glass, it does provide sufficient flint glass for the targeted products at a very high purity level. Optionally, additional separation and capture of a higher percentage of flint glass can be carried out with additional optical sorter(s) in series. It is appreciated that if a white pozzolan, a white industrial filler, or other glass product requiring a higher percentage of flint glass are not intended end-use products, then the step of sorting flint cullet from the colored glass cullet can be eliminated from the process.

The near clean non-flint glass exiting the optical sorter 44 may still have hard stones and heavy non-ferrous objects therewithin. This is because such objects have similar densities to glass, and will therefore remain with the glass portion through density separation within the Stoners 30, 32, 34, 36 and 38. After the optional optical sorting at 44, such like density impurities are removed from the glass. This is accomplished by pulverizing the glass at 48, preferably using a vertical shaft impactor (VSI) mill equipped with a tubular rotor. A VSI mill comminutes particles of material into smaller (finer) particles by impacting the particles against a hard surface inside the mill (called the wear plate). The tubular rotor increases the impact velocity of the glass on the wear plate. A screen 50 with an aperture size larger than the largest comminuted glass particles will screen out any remaining foreign objects that are not reduced in size by the VSI. The foreign objects are sent by eddy current 16 to remove non-ferrous objects and then to the trash storage 20.

All of the remaining clean glass 52 at this stage (excepting the prior separated flint glass) is collected into clean glass storage containers, bunkers, or locations.

Once the clean glass is collected at storage containers 52, it is ready to be further processed, as described below.

CRT glass (whether panel glass or tube glass) can be pre-processed using the same process of FIG. 1, or a modified version of the process of FIG. 1. Typically, CRT panel glass will be received as twelve-inch size pieces that have been cut, tumbled, and cleaned. In such cases where the CRT glass is already cleaned, only a portion of the cleaning process of FIG. 1 may be performed. For example, steps 10 to 46 may be omitted if the CRT glass received has already been cleaned and dried. Regardless of the received condition of the CRT glass, in the case of processing the CRT glass using either the full or partial steps of the process of FIG. 1, the pulverizing step 48 can be used as a primary grinding step to reduce the size of the crushed, semi-ground CRT glass aggregate down to ¼" minus to 7 mesh minus.

For many end-use purposes, the glass (CRT glass and waste glass), once clean, often requires fine grinding, although such additional grinding is not a necessary part of the process for cleaning the waste glass. The glass designated for glass particles, glass powders and glass fillers that do not have a whiteness or brightness requirement is preferably processed separately from the flint glass, as described below.

The following description is of a method of milling cleaned waste glass separately to obtain a waste glass powder, which is a pozzolan. As will be described below, the same process may be used as a method of milling cleaned CRT glass separately to obtain a CRT glass powder, which can be blended with the aforementioned waste glass powder, in accordance with the first exemplary method described above.

Clean glass 52 is transferred from its storage to a mill feed hopper 60 which supplies the clean glass to a fine grinding apparatus 64. Fine grinding can occur in any type of fine grinding apparatus 64 sufficiently robust to grind glass including, but not limited to, all types of ball mills and tube mills, vertical roller mills, attritor mills (stirred media mills and dense packed stirred media mills), vibratory mills, jet mills (or Air Classification Mills), ISA mills, Roller mills, High Pressure Grinding Rolls (HPGR) and Aerosion Ltd's "disintegrator" technology. The ball mill is proven technology for grinding bottle glass and is reasonably efficient when grinding feed stock of this size. These ultra-fine particles create a very large specific surface area which is positively related to pozzolanic reactivity.

Fine grinding 64 occurs in a closed-loop circuit utilizing a dynamic air classifier 66 that can produce a relatively narrow particle size distribution consistently. The air classifier 66 is employed to separate particles from the fine grinding apparatus 64 when they become the target size. The air classifier is an industrial machine which separates materials by a combination of size, shape, and density. The air classifier works by injecting the material stream to be sorted into a chamber that contains a column of rising air. Inside the separation chamber, air drag on the objects supplies an upward force which counteracts the force of gravity and lifts the material to be sorted up into the air. Due to the dependence of air drag on object size and shape, the objects in the moving air column are sorted vertically and can be separated in this manner.

The many air classifier technologies are generally classified as either static or dynamic. One dynamic air classifier technology employs a rotor with many blades that at the right rotational velocity allows lightweight particles to pass through without contacting the rotor blades and slower moving heavy particles make contact with the blades and are knocked to the outer side of the classifier and are conveyed back to the grinding device for additional size reduction. The particles removed from the air classifier are separated from the air stream by a cyclone or bag house. The rotor rotational speed determines the material cut point size. This is the preferred air classification technology.

The particle size targeted by these grinding circuits ranges from a median particle size of 12 micron down to 4 micron and smaller depending on the type and size of grinding device. The fine grinding apparatus 64 may have a different throughput rate depending on device type and size.

Another optional step is to include further grinding and/or classification devices to produce even smaller particle sizes. One method is to perform secondary air classification on the 10 or 12 micron median size particle material that splits it into two sizes, each with their own particle size distribution. The larger material can either be marketed as a different product if such a market exists. Otherwise, it must go back into the grinding device for further size reduction. This works well for most grinding devices except vertical roller mills because the addition of fine material into the mill has a cushioning effect that reduces throughput rates.

If finer grinds down to submicron size are contemplated, there are at least two options that can handle grinding to sizes ranging from 5-6 micron median particle size to submicron sizes: a jet mill and dense packed stirred media mill.

The grinding friction in some dense packed stirred media mills generate significant heat and the units must be equipped with a metal jacket to circulate water for cooling. The preferred option is a dense packed stirred media mill because it requires a fraction of the energy that a jet mill requires to achieve these ultra-fine grinds.

In order to increase process throughput in the fine grinding stage, multiple hopper/feeders 60 and fine grinding apparatus 64 may be used to convey the glass and grind the glass to a suitable size, with oversize glass particles being returned at 68 by one or respective air classifiers 66 for further fine grinding in the respective mills 64.

Pozzolanic glass particles that are intended for use in concrete products that use gray Portland cement do not have whiteness or brightness requirements, whereas flint glass particles can be used to manufacture products requiring extremely white and bright powder, such as industrial filler and white cement concrete products. The final processing of these glass products may utilize separate hoppers/feeders, grinding apparatus, and air classifiers to prevent color contamination of the white products.

Once the glass particles are ground to the desired particles size range, with a defined particle distribution, they are collected at 70. From collection 70, the glass preferably passes through a final screening 72. In the case of waste glass, it is recognized that not all of the paper labels are removed by the abrasion in the rotary dryer or the Stoner separation technology. When the glass is ground in the fine grinding apparatus, the paper is fully liberated into individual fibers which tend to attract each other and ball up into small dust balls. The overall quantity is small (much less than 1%) but depending on the actual quantity and end use of the glass powder, it may or may not be a problem. Architectural concrete products do not tolerate impurities well, whereas it is not a problem for most gray concrete products. Further, the presence of paper fiber eliminates the glass for use in most industrial filler applications. The paper fiber can be screened out by a 45 to 325 micron screen at 72, and sent to trash 20, yielding an extremely clean powdered glass product. The screening can be done for any size material that is 12 micron median particle size or less. The yielded glass powder 74 is very clean and suitable for all industrial fillers and architectural concrete applications. The glass powder 74 is sent to storage, bagging, truck load out, or location for later or immediate use.

Figure 2:
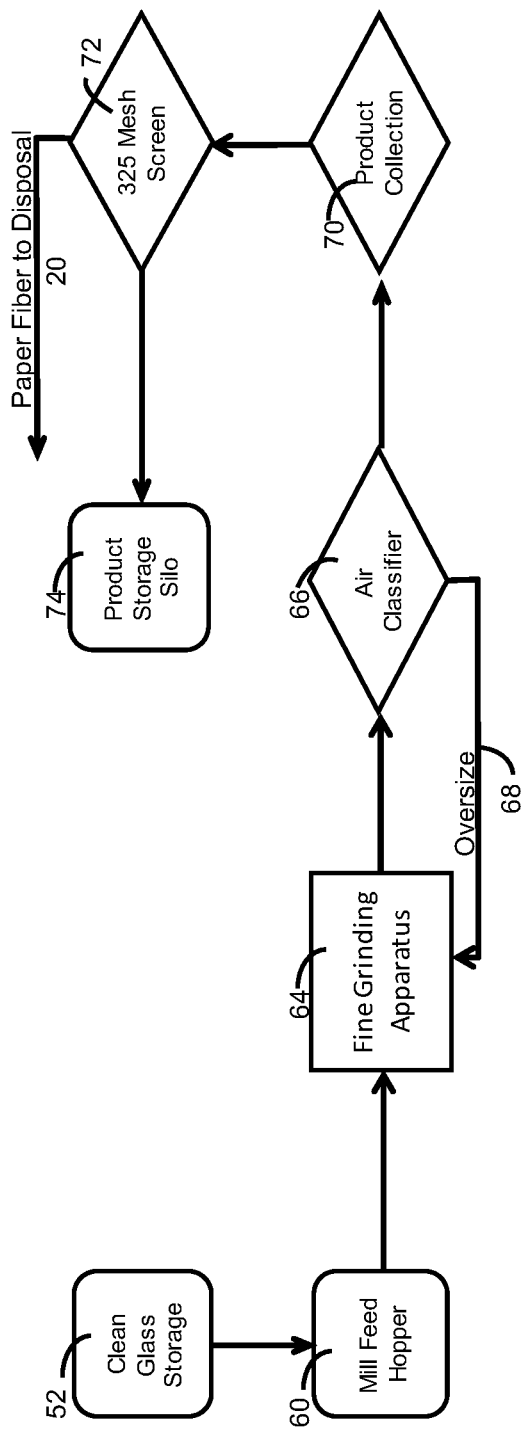
FIG. 2 is a process flow diagram for a grinding portion of the process.

As discussed above, when the process in FIG. 2 is used to process CRT glass, the cleaned and dried CRT glass in storage 52 may be milled separately using the same fine grinding process of FIG. 2 to obtain a pozzolanic CRT glass powder, which can be blended with the waste glass powder, as described in greater detail below.

Figure 3:
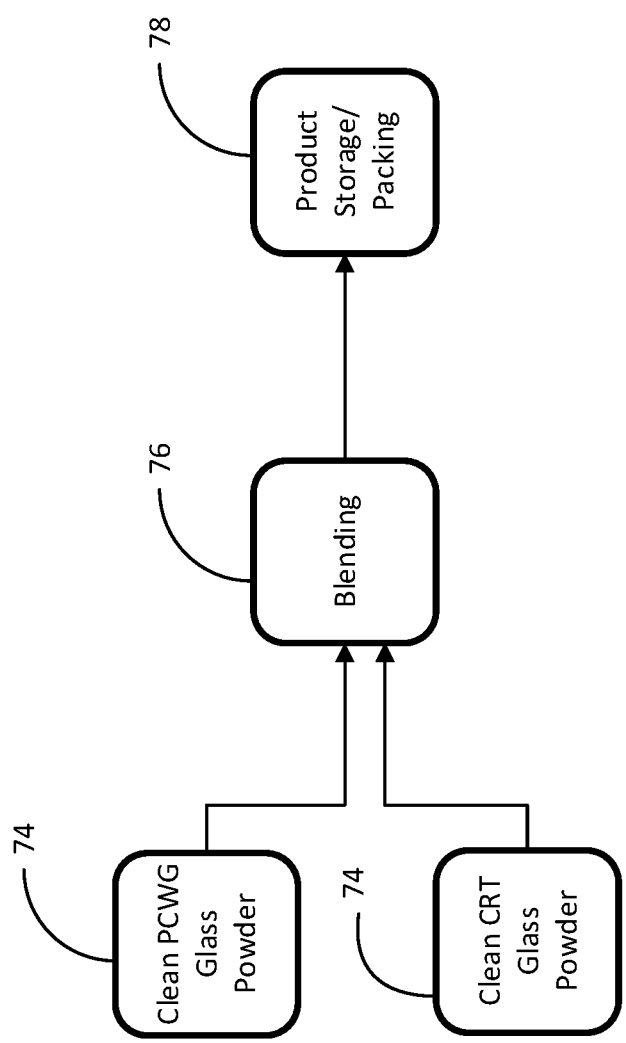
FIG. 3 is a process flow diagram for blending CRT glass powder and waste glass powder.

As shown in FIG. 3, CRT glass powder in storage at 74 and waste glass powder in storage at 74 are blended together by volume or weight at 76 to form a pozzolonic mixture that can be used as a substitute for Portland cement in a cementitious mixture. In the case of leaded CRT tube glass powder, it is appreciated that the tube glass may only have a lead content of about 23%, which may not be sufficiently high, by itself, as the radiation barrier when the CRT powder and PCG powder are used in radiation barrier concrete. Thus, for radiation barrier concrete, additional lead may optionally be added to the pozzolanic mixture at 78 to supplement the lead in the CRT glass powder.

Figure 4:
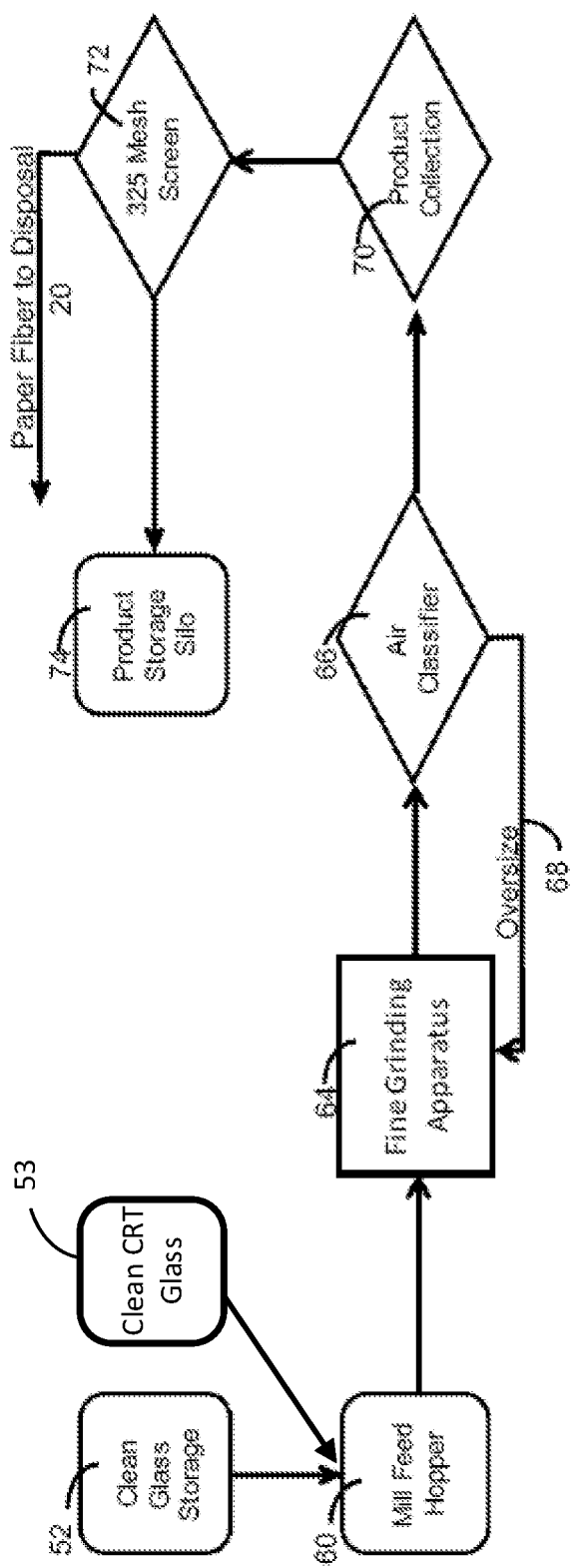
FIG. 4 is a process flow diagram for a co-milling process.

As noted above, instead of creating individual fine powders of CRT glass and waste glass and blending them together after each powder is separately formed, an alternate method may be followed as shown in FIG. 4, in which cleaned and dried CRT glass that is stored at 53 and cleaned and dried waste glass that is stored at 52 are mixed together by weight or volume and auger-fed into mill feed hopper 60. Then, the mixture of CRT glass and waste glass can be ground or milled together (co-milled) and further processed into a pozzolanic powder according to the steps 64 to 74 shown in FIG. 2, which were previously described. As a result of the co-milling process, the produced mixed powder of CRT glass and waste glass will be stored in product storage silo 74.

From the above, it is recognized that the combined waste glass and CRT glass can be processed into a number of products that range in size from sub-micron to 1½ inch glass aggregate. These include, but are not limited to, fine grind products (325 minus) such as pozzolans for use as a cement replacement in concrete and industrial fillers for use in coatings and resins, sand sized products such as abrasive blasting media, water filtration media, specialty sands paver joint sand, sealcoating sand and non-crystalline silica play sand, and finally aggregate sized products for use in landscaping, decorative concrete, fire pits, etc.

Also, where the system and process are described with multiple references to eddy currents and trash storage, it is recognized that that a single or multiple eddy current can be used, and similarly a single or multiple trash storage can be used, or preferably strategically positioned within or throughout the overall system.

ASTM C-618 is the standard that fly ash and natural pozzolans must meet in order to be used as supplementary cementitious materials in concrete. ASTM C-618 contains a number of test methods and corresponding thresholds which must be met. The two most important thresholds that determine the quality of a pozzolan are the strength activity index (SAI) and the quantity of silica, alumina and iron, which are the components that provide the pozzolanic properties.

The SAI test method involves preparing mortar cubes using ASTM approved sand and cement. One set of cubes uses cement only and the other set replaces 20% of the cement with a pozzolan. This was performed for both co-milled glass samples. The compressive strength of the cubes are measured after 7 and 28 days. To meet ASTM C-618, the strength of the cubes with 20% pozzolan must be a minimum of 75% of the strength of the control after both 7 and 28 days.

Four samples of finely divided glass were obtained from Urban Mining Northeast (UMN): 100% soda-lime glass, co-milled 95% soda-lime glass/5% CRT panel glass, co-milled 85% soda-lime glass/15% CRT panel glass and 100% CRT panel glass. Chemical analyses were performed on all four samples as per ASTM C-311 and pozzolan suitability analyses were performed as per ASTM C-618. The CRT panel glass was supplied to UMN by Electronic Recyclers International, Inc (ERI).

The 7 and 28 day ASTM C-618 results presented in Table 2 show that both co-milled glass samples exceeded the threshold of 75% by wide margins for both the 7 and 28 day breaks.

TABLE 2

| | Sample | | |
|---|---|---|---|
| Parameter | %5 CRT Co-Mill | 15% CRT Co-Mill | Threshold |
| 7 Day SAI | 88% | 88% | >75% |
| 28 Day SAI | 97% | 98% | >75% |
| Sum Si + Al + FE | 75% | 74% | >70% |

ASTM C-618 requires that the sum of the oxides of silica, alumina and iron ($SiO_2$, $Al_2O_3$ and $Fe_2O_3$) must be a minimum of 70% of the total weight. Table 2 shows that this requirement is met. The SAI and chemical composition results are typical of 100% soda-lime glass.

Based on information contained in published reports on the chemical composition of CRT panel glass, there is a concern that there is lead contamination and high barium concentrations. The results of the full chemical analyses of all four glass samples is shown in Table 3. Not only did lead not show up in a measurable concentration, no other heavy metal was found to be present and barium was present in very low concentrations. Table 3 also shows that there is little difference in chemical composition between the four samples.

CRT Panel glass co-milled or blended with soda-lime glass produces a pozzolan containing no heavy metals or potentially hazardous components. It is clear that the chemical composition of the CRT panel glass in the sample analyzed herein is very similar to typical soda-lime glass. This was unexpected, given contradictory indications of relatively low silica (~60%) in prior literature. If the tested sample of CRT panel glass is representative of all CRT panel glass recycled by ERI, then it can be concluded that this panel glass is suitable for the same applications as soda-lime glass, including, but not limited to, pozzolans, abrasive blasting media, specialty sands, etc. Specifically, the waste glass can be co-milled or co-blended with 1 to 99% of CRT panel glass provided that the resulting product meets the ASTM C-618 standard for silica, alumina, and ferrous components. Further, waste glass co-milled or co-blended with 1 to 30%, and more preferably 1 to 10%, and even more preferably 1 to 5%, of CRT panel glass will reliably have a silica, alumina, and ferrous constituency in excess of the ASTM C-618 standard, without a priori testing of the chemical composition of the CRT panel glass. That is, with increased weight or volume percentage of waste glass relative to CRT glass, a higher confidence level is obtained that the glass will meet ASTM C-618 without a priori testing of the CRT panel glass. Of course, periodic, including batch testing of the manufactured glass powder can be tested to assure that chemical composition meets the required standard for the intended use.

TABLE 3

Chemical Analyses of Soda-Lime and CRT Panel Glass Mixes

| | | Percent of Total Weight | | | |
|---|---|---|---|---|---|
| Chemical Component | Symbol | 100% Soda Lime | 95% Soda Lime 5% CRT | 85% Soda Lime 15% CRT | 100% CRT |
| Silicon Dioxide | $SiO_2$ | 72.38% | 68.79% | 71.31% | 72.83% |
| Aluminum Oxide | $Al_2O_3$ | 1.86% | 5.72% | 2.53% | 1.22% |
| Iron Oxide | $Fe_2O_3$ | 0.43% | 0.61% | 0.37% | 0.17% |
| Sum of $SiO_2$, $Al_2O_3$ & $Fe_2O_3$ | | 74.67% | 75.12% | 74.21% | 74.22% |
| Calcium Oxide | CaO | 10.57% | 9.74% | 9.96% | 8.52% |
| Magnesium Oxide | MgO | 1.01% | 1.10% | 1.29% | 2.23% |
| Sodium Oxide | $Na_2O$ | 12.93% | 12.38% | 13.51% | 14.14% |
| Potassium Oxide | $K_2O$ | 0.61% | 0.76% | 0.58% | 0.35% |
| Sulfur Trioxide | $SO_3$ | 0.13% | 0.14% | 0.17% | 0.22% |
| Titanium Dioxide | $TiO_2$ | 0.08% | 0.13% | 0.07% | 0.04% |
| Manganese Dioxide | $MnO_2$ | 0.01% | 0.01% | 0.01% | 0.00% |
| Phosphorus Pentoxide | $P_4O_{10}$ | 0.02% | 0.06% | 0.03% | 0.01% |
| Strontium Oxide | SrO | 0.06% | 0.26% | 0.07% | 0.15% |
| Barium Oxide | BaO | 0.10% | 0.29% | 0.09% | 0.11% |
| Moisture Content | | 0.18% | 0.18% | 0.09% | 0.17% |
| Loss on Ignition | | 0.66% | 0.72% | 0.54% | 0.35% |

In addition, the various formulations of glass powder (ranges of soda lime glass to CRT glass) all show excellent results in loss on ignition (LOI). Sample test results show a LOI of down to 0.35%, substantially better than the LOI of 1.44% from prior art that used a different method which also does not liquid wash the dirty glass to clean the glass. This indicates that the clean glass from the described cleaning method was substantially free of organics, and at a level that is inconsequential to the performance of a pozzolan. The LOI of glass cleaned in accord with the described method is repeatable, and will consistently have a LOI not exceeding 1%, and preferably less than 0.75%, more preferably at or about 0.6%.

There have been described and illustrated herein embodiments of processes to clean and fine grind glass. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its scope as claimed. For example, while a preferred method of cleaning waste glass has been described, it will be appreciated that other cleaning methods may be used to clean the waste glass without deviating from the invention.

What is claimed is:

1. A process for making a pozzolanic mixture as a substitute for Portland cement, comprising:
    receiving CRT glass aggregate having, on average, a first chemical composition that does not exceed 70% total weight of oxides of silica, alumina and iron;
    pulverizing the CRT glass aggregate forming an intermediate CRT glass product;
    receiving waste glass aggregate having, on average, a different chemical composition from the CRT glass aggregate;
    pulverizing the waste glass forming an intermediate waste glass product;
    combining the waste glass product with the CRT glass product to form a mixture, wherein the waste glass product of the mixture is a majority of the mixture, and the CRT glass product is 1 to 30% of the mixture; and
    fine grinding the mixture together into a glass powder so that by weight or volume the sum of oxides of silica, alumina and iron of the glass powder is at least 70% of the total weight of the glass powder.

2. The process of claim 1, wherein:
the CRT glass product is 1 to 10% of the mixture.

3. The process of claim 1, wherein:
the CRT glass product is 1 to 5% of the mixture.

* * * * *